US 8,190,055 B2

(12) United States Patent
Satoh

(10) Patent No.: US 8,190,055 B2
(45) Date of Patent: May 29, 2012

(54) ELECTRONIC DEVICE WITH A FUNCTIONAL UNIT ARRANGED ADJACENT TO AN OPERATING SURFACE

(75) Inventor: Yuki Satoh, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 257 days.

(21) Appl. No.: 12/457,236

(22) Filed: Jun. 4, 2009

(65) Prior Publication Data

US 2009/0324258 A1 Dec. 31, 2009

(30) Foreign Application Priority Data

Jun. 27, 2008 (JP) ................................. 2008-168169

(51) Int. Cl.
*G03G 15/00* (2006.01)
(52) U.S. Cl. ............................................ 399/107; 399/1
(58) Field of Classification Search .............. 399/1, 107; 312/223.2
See application file for complete search history.

(56) References Cited

U.S. PATENT DOCUMENTS

| RE37,157 E | * | 5/2001 | Ikeda et al. .................... 399/124 |
| 7,486,903 B2 | * | 2/2009 | Asakawa ....................... 399/107 |
| 2007/0160383 A1 | | 7/2007 | Matsumoto et al. |

FOREIGN PATENT DOCUMENTS

| JP | 2001-106415 | 4/2001 |
| JP | 2005-043633 | 2/2005 |
| JP | 2007-248555 | 9/2007 |

OTHER PUBLICATIONS

English Translation of JP2005-043633 to Watabe.*

* cited by examiner

*Primary Examiner* — Ryan Walsh
(74) *Attorney, Agent, or Firm* — Harness, Dickey & Pierce, P.L.C.

(57) ABSTRACT

A flat surface is arranged, adjacent to an operating surface of an image forming apparatus, at a lower position than the operating surface. A small-object placing member for placing clips is arranged on the flat surface. The small-object placing member includes a slanting surface that recedes towards an inner side from a side of an operator who operates the operating surface.

14 Claims, 5 Drawing Sheets

ELECTRONIC DEVICE WITH A FUNCTIONAL UNIT ARRANGED ADJACENT TO AN OPERATING SURFACE

CROSS-REFERENCE TO RELATED APPLICATIONS

The present application claims priority to and incorporates by reference the entire contents of Japanese priority document 2008-168169 filed in Japan on Jun. 27, 2008.

BACKGROUND OF THE INVENTION

1. Field of the Invention

The present invention relates to an electronic device.

2. Description of the Related Art

In an electronic device such as an image forming apparatus, various functional units need to be arranged in order to respond to diverse expectations of a user.

A chassis of an image forming apparatus disclosed in Japanese Patent Application Laid-open No. 2007-248555, includes a scanner for scanning an original, an image forming processor that is arranged below the scanner, a discharging unit that is a space formed between the scanner and the image forming processor in a longitudinal direction, and an operation panel on a front surface of the scanner. A storing unit for storing therein small objects such as clips or stapler pins is arranged inside the space in the longitudinal direction of the discharging unit below the operation panel. Thus, the storing unit that functions as a functional unit called a small-object placement space is arranged in the space between the operation panel and the discharging unit. This configuration secures visibility of the discharging unit and prevents falling of the small objects.

In an image forming apparatus disclosed in Japanese Patent Application Laid-open No. 2001-106415, a discharging unit ejects image-printed papers on a catch tray. A concave portion, in which small objects used in office can be placed, is arranged in the catch tray. The concave portion functions as a functional unit called a small-object placement space that is arranged on the catch tray and that enhances operability of the user.

An image forming apparatus disclosed in Japanese Patent Application Laid-open No. 2005-43633 includes a small object container that is removably arranged on a main body of the image forming apparatus. A handle is arranged in the center of a receiving tray of the small object container. Clips and stapler pins can be stored separately in the small object container. The shape of the small object container is a smooth curvilinear structure from a bottom surface. In this configuration, the stored objects can be easily taken out simply by tilting the small object container. Thus, the small object container, which contains the clips and the stapler pins that are formed of a predetermined shape, is removably arranged on the main body of the image forming apparatus.

However, in the conventional image forming apparatuses, because the functional unit is fixedly arranged on the image forming apparatus, a function of the functional unit is limited to a single type of function. Due to this, arranging the functional unit results in occupation of space and proves to be a hindrance when additional functions need to be added for reducing a size of the image forming apparatus in accordance with recent technical trends.

SUMMARY OF THE INVENTION

It is an object of the present invention to at least partially solve the problems in the conventional technology.

According to an aspect of the present invention, there is provided an electronic device including a flat surface adjacent to an operating surface of the electronic device and at a lower level than the operating surface; and a functional unit that has a predetermined function arranged on the flat surface, and the functional unit includes a slanting surface that recedes towards an inner side from a side of an operator who operates the operating surface.

According to another aspect of the present invention, there is provided an electronic device including flat surface means adjacent to an operating surface of the electronic device and at a lower level than the operating surface; and functional means that has a predetermined function arranged on the flat surface means, and the functional means includes a slanting surface that recedes towards an inner side from a side of an operator who operates the operating surface.

According to still another aspect of the present invention, the above electronic device is an image forming apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments according to the present invention are explained below with reference to the accompanying drawings.

Figure 1:
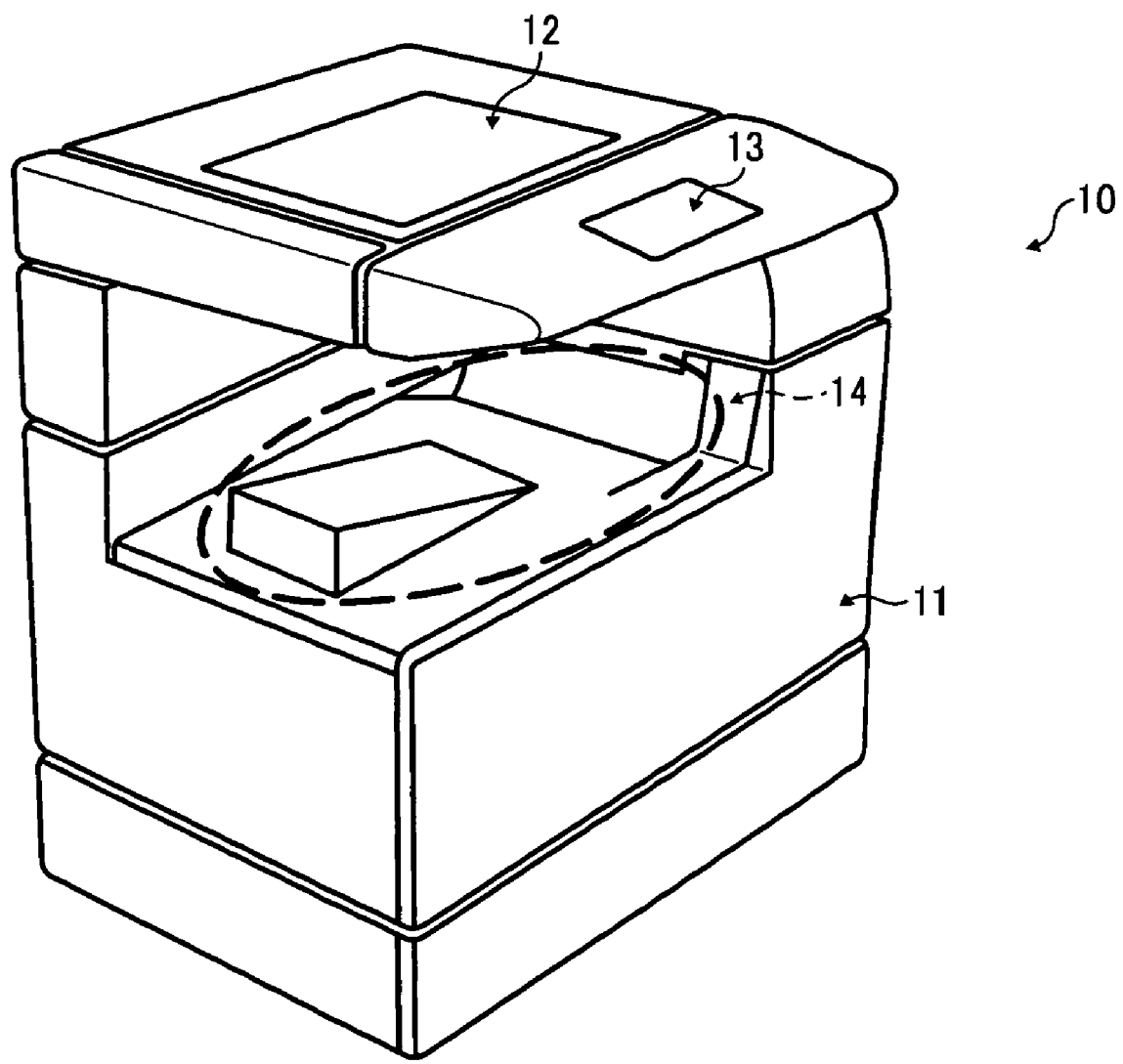
FIG. 1 is a schematic perspective view of an image forming apparatus according to an embodiment of the present invention.
Figure 2:
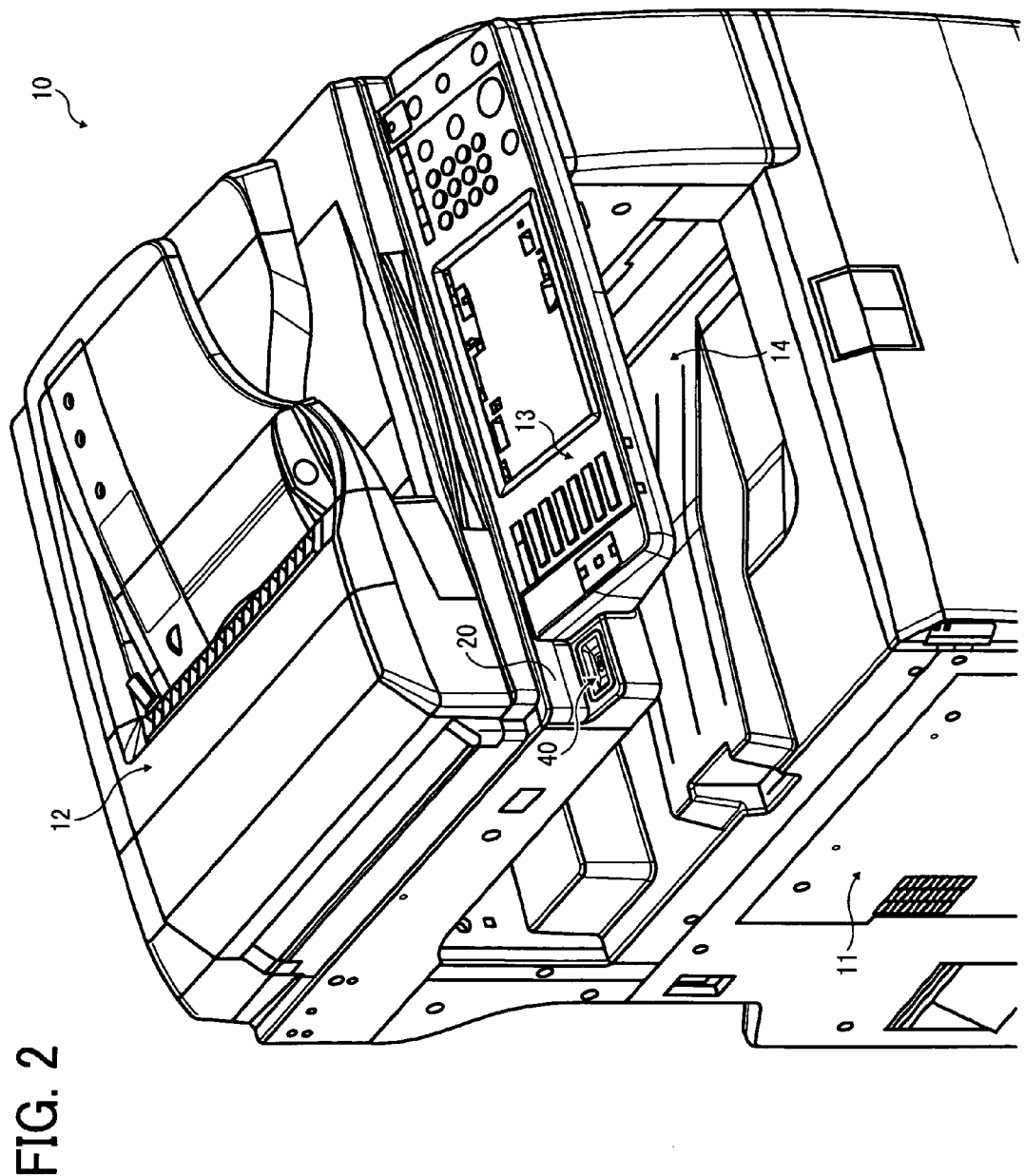
FIG. 2 is a detailed perspective view of an upper portion of the image forming apparatus shown in FIG. 1.
Figure 3:
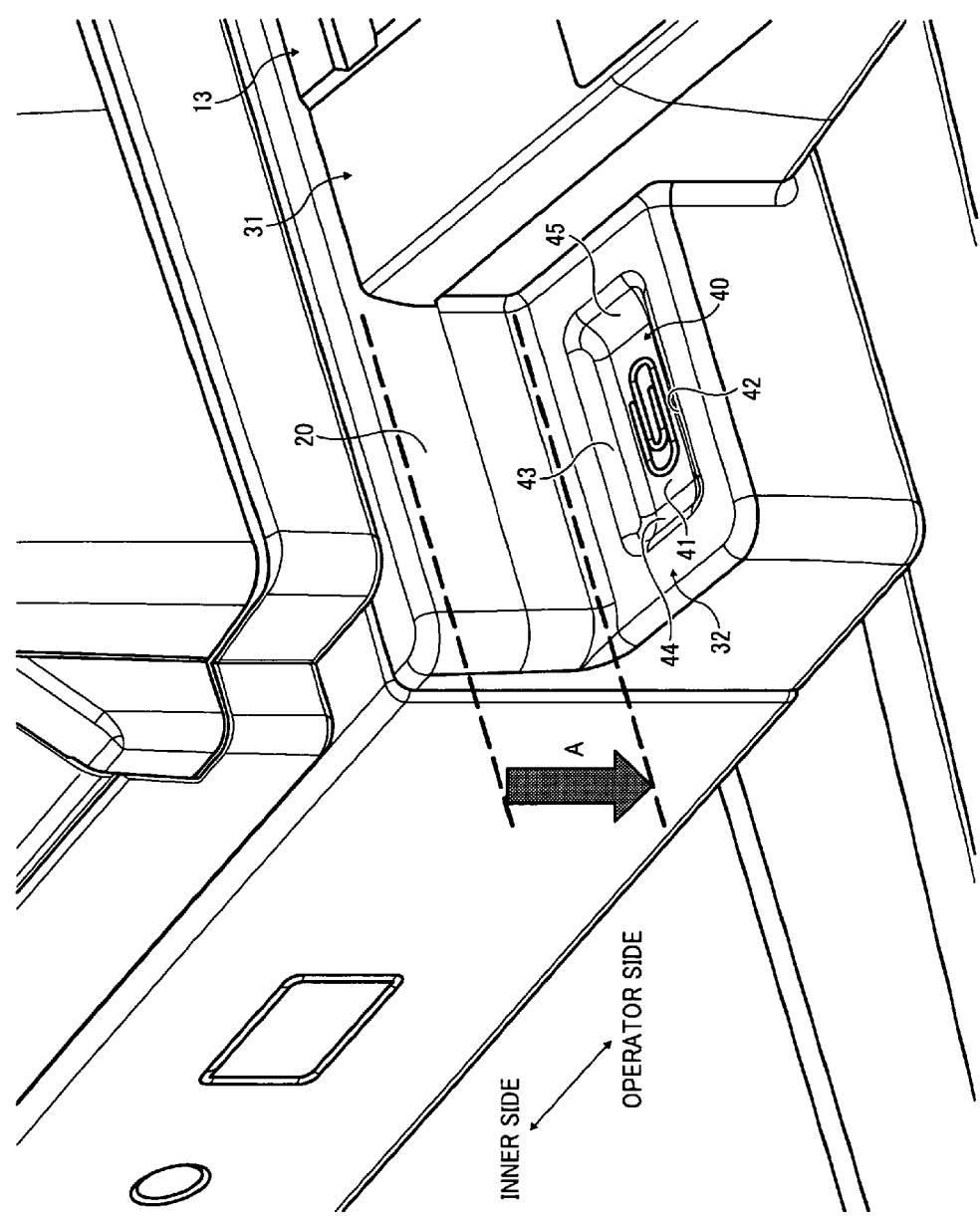
FIG. 3 is an enlarged perspective view of a portion of the image forming apparatus where a small-object placing member is provided.

An electronic device according to an embodiment of the present invention is explained next with reference to the accompanying drawings. An image forming apparatus is explained below just as an example of the electronic device. FIG. 1 is a schematic diagram of an image forming apparatus 10 according to the embodiment. FIG. 2 is a detailed perspective view of an upper portion of the image forming apparatus 10. FIG. 3 is an enlarged perspective view of a portion of the image forming apparatus 10 where a small-object placing member is provided.

The image forming apparatus 10 includes an image forming unit 11, a scanning unit 12, and an operating unit 13. A catch tray 14 is arranged in a space that is formed between the image forming unit 11 and the operating unit 13.

As shown in FIG. 3, a vertical surface 20 and a flat surface 32 are formed adjacent to an operating surface 31 of the operating unit 13. In the example shown in FIG. 3, the horizontal surface 32 is arranged at a distance A in a lower direction with respect to the operating surface 31. A small-object placing member 40 is formed as a functional unit in the flat surface 32. The small-object placing member 40 is formed integrally in the flat surface 32. Clips or stapling pins can be placed in the small-object placing member 40 if required. The small-object placing member 40 has a bottom surface 41 and four slanting surfaces 42, 43, 44, and 45 that are arranged on four sides of the bottom surface 41. A clip mark is drawn on the bottom surface 41; however, such a clip mark is not mandatory.

The slanting surface 42 recedes in the lower direction towards an inner side from a side of an operator who operates the operating unit 13. A magnet sheet that functions as a magnetized member is attached to a back surface (device inner side) of the bottom surface 41 of the small-object placing member 40. The clips will not fall down from the small-object placing member 40 because the clips adhere to the bottom surface 41 due to the magnetic force of the magnet sheet.

A speaker, which includes a permanent magnet, can be arranged as the magnetized member instead of the magnet sheet. When using the speaker, the speaker is arranged near the operator. Due to this, audibility of sound can be enhanced and the magnetic force of the speaker enables to cause the clips to adhere to the bottom surface 41.

Thus, the small-object placing member 40 is arranged on the flat surface 32 that is arranged at the distance A in the lower direction from the operating unit 13 so that operability is enhanced. Moreover, the magnetized member is provided on the back surface of the bottom surface 41 of the small-object placing member 40 so that the clips adhere to the bottom surface 41 and therefore do not fall down. Because the slanting surface 42 is slanted in the lower direction towards the inner side from the front side, the clips do not fall easily and are reliably held inside the small-object placing member 40.

Figure 4:
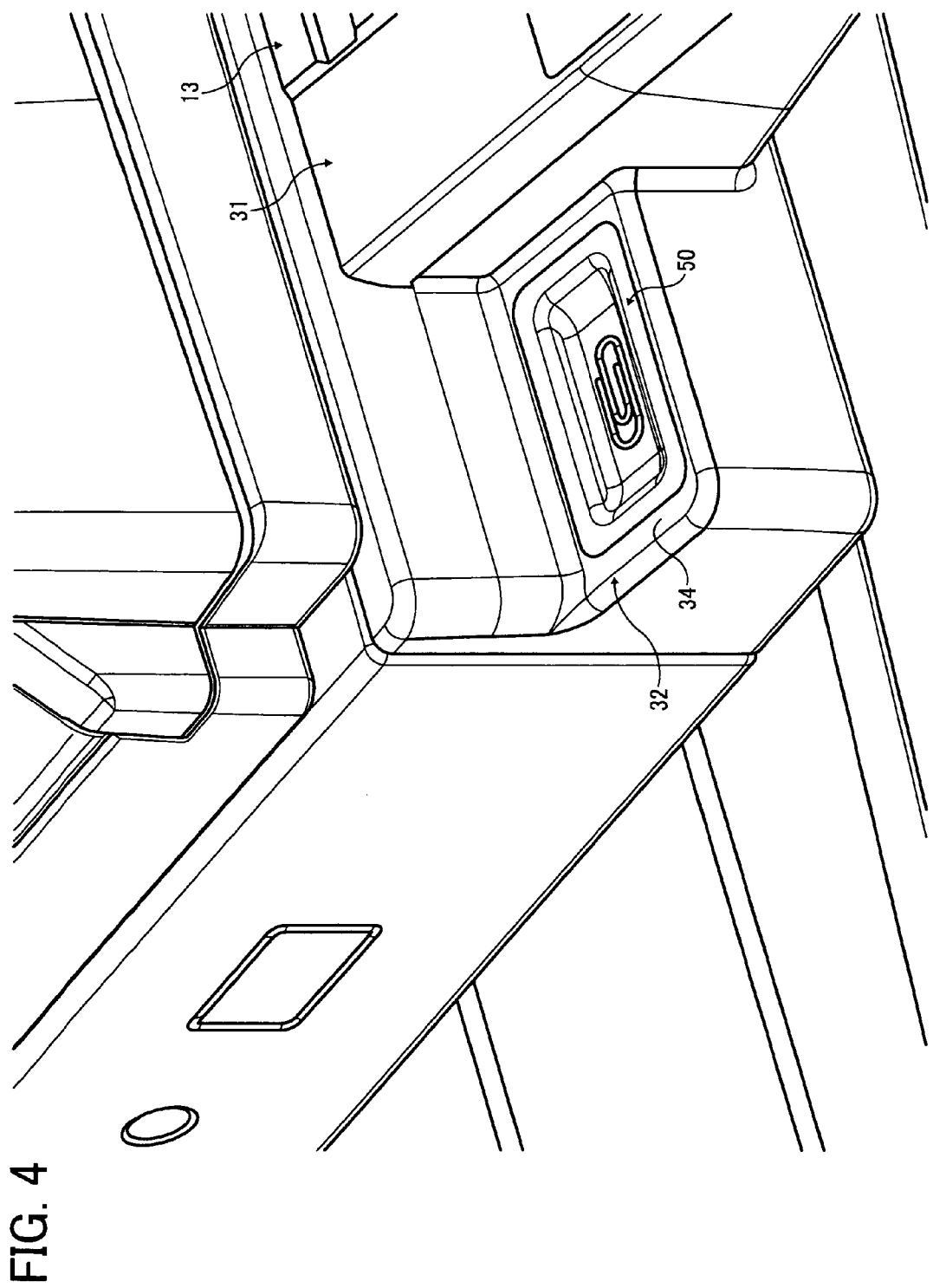
FIG. 4 is an enlarged perspective view of a portion of an image forming apparatus where a small-object placing member according to another embodiment is provided.

FIG. 4 is an enlarged perspective view of a portion of an image forming apparatus where a small-object placing member 50 according to another embodiment is provided. The small-object placing member 50 is prepared as a separate component from a surface panel 34 of the flat surface 32. The small-object placing member 50 is a clip placing member same as the small-object placing member 40. However, the small-object placing member 50 can be a media placing member, a sensor of a biometric verifying device such as a fingerprint verifying device, a face verifying device, an iris verifying device etc.

Figure 5:
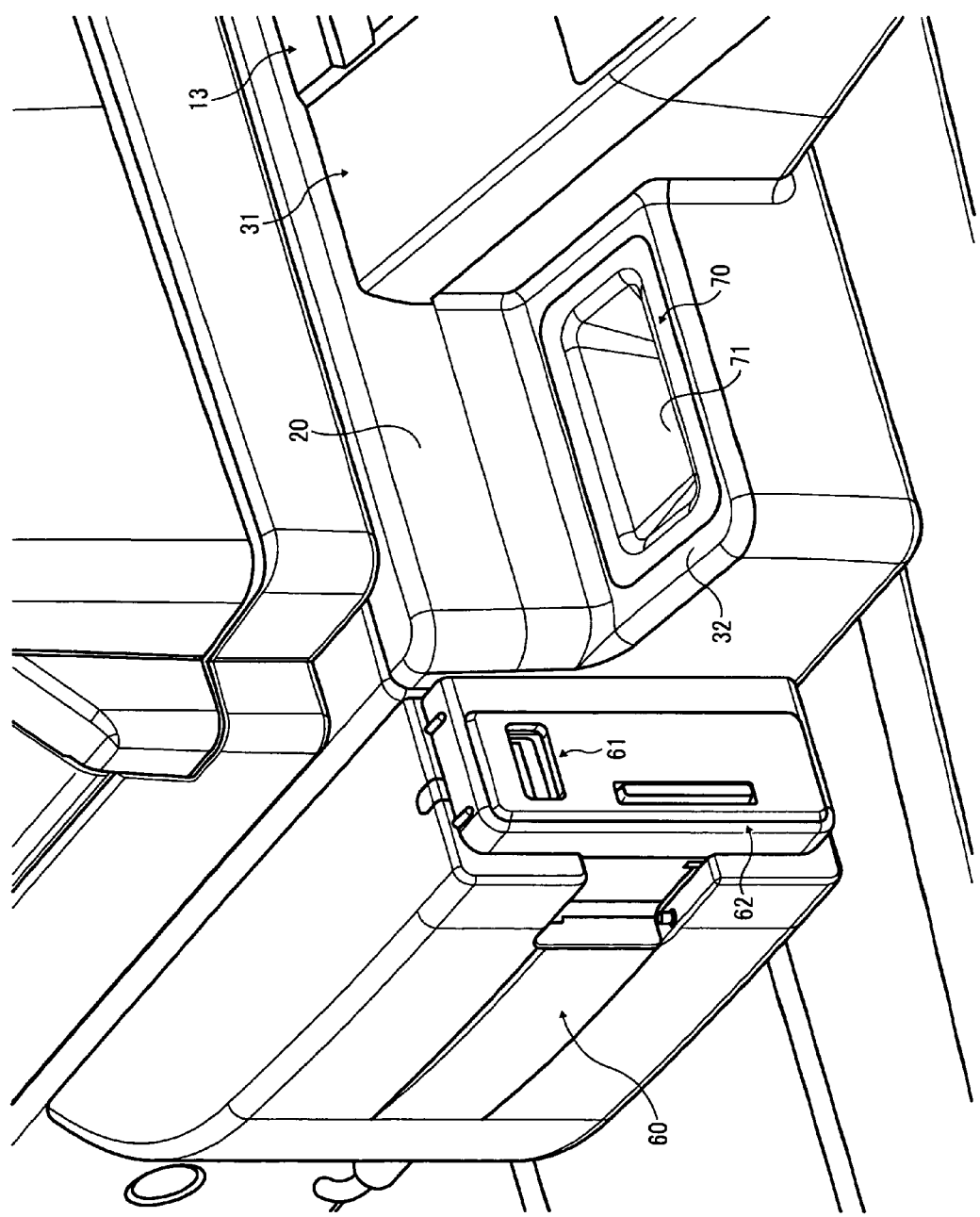
FIG. 5 is an enlarged perspective view of a portion of an image forming apparatus where a functional unit according to still another embodiment is provided.

FIG. 5 is an enlarged perspective view of a portion of an image forming apparatus where a media reader option 60 according to still another embodiment is provided. The media reader option 60 is arranged on a surface that is near the flat surface 32. The media reader option 60 includes a universal serial bus (USB) slot 61 and a user's supplementary documents (USD) card slot 62. The media reader option 60 can be exchanged as a functioning component with a media arranging unit 70 that includes a deep tray 71.

The color and the material of the small-object placing members 40, 50 or the media arranging unit 70 can be the same as those of the flat surface 32 or can be different. When they are same, the entire image forming apparatus 10 looks continuous and attractive. The functional units, such as the small object placing member, can be formed of a transparent material. When the functional unit is formed of a transparent material, the operator can view if a sheet is present in the catch tray 14 through the transparent functional unit.

The small-object placing member for placing the clips or media, or the sensor of the biometric verifying device such as the fingerprint verifying device, the face verifying device, the iris verifying device etc. can be prepared as the functional unit, and the functional unit can be appropriately selected and arranged at the time of manufacturing and installation. Accordingly, members that include the necessary functions can be arranged on the electronic device as desired. Thus, the electronic device can be made compatible with diverse functions.

A functioning-member holding unit can be arranged that can hold the functional unit at places other than the flat surface, for example, inside the electronic device or on a side surface of the electronic device. Another functional unit, which includes other functions, can be held in the functioning-member holding unit, and the functional unit arranged on the flat surface can be arbitrarily replaced. Due to this, because the necessary functional unit can be arranged on the flat surface, usage efficiency of the electronic device is enhanced. Further, based on a user's wish, various types of functional units can be prior arranged, selected, and fixed to the electronic device and the remaining functional units can be held in the functioning-member holding unit. Thus, loss of the functional units can be prevented. An image forming apparatus is explained above as an example of the electronic device. However, the electronic device is not limited to the image forming apparatus, and other electronic devices can also be used.

According to an aspect of the present invention, desired functioning units can be freely arranged in the vicinity of an operating unit without reducing operability, visibility, and diversity or with enhanced operability, visibility, and diversity.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device, comprising: an image forming unit; a scanning unit; and an operating unit having an operator surface thereof, the operating unit includes: a flat surface adjacent to an operating surface of the electronic device and at a lower level than the operating surface; a functional unit having a set function and arranged on the flat surface in a replaceable manner, the functional unit includes a slanting surface that recedes towards an inner side from a side of an operator who operates the operating surface; and a magnetized member arranged on a back side or on a lower portion of the functional unit so that a small object adheres to a bottom surface of the functional unit due to magnetic force of the magnetized member.

2. The electronic device according to claim 1, wherein the magnetized member is a speaker that is arranged inside the electronic device.

3. The electronic device according to claim 1, wherein an additional functional unit that is arranged separately from a main body of the electronic device and is replaced with the functional unit already placed in the flat surface.

4. The electronic device according to claim 3, further comprising a member holding unit that is arranged at a place other than the flat surface and that holds therein the additional functional unit.

5. The electronic device according to claim 1, wherein the functional unit is formed of a material, a color whereof differs from a color of the main body of the electronic device, or formed of a transparent material.

6. The electronic device according to claim 1 is an image forming apparatus.

7. An electronic device, comprising: an image forming unit; a scanning unit; and an operating unit having an operator surface thereof, the operating unit includes: flat surface means for arranging functional means thereof in a replaceable manner, the flat surface means being adjacent to an operating surface of the electronic device and at a lower level than the operating surface, wherein the functional means has a set function arranged on the flat surface means, and the functional means includes a slanting surface that recedes towards an inner side from a side of an operator who operates the operating surface; and a magnetized means for magnetizing the functional means, the magnetized means is arranged on a back side or on a lower portion of the functional means so that a small object adheres to a bottom surface of the functional unit due to magnetic force of the magnetized member.

8. The electronic device according to claim 7, wherein the magnetized means is a speaker that is arranged inside the electronic device.

9. The electronic device according to claim 7, wherein an additional functional means that is arranged separately from a main body of the electronic device and is replaced with the functional unit are prepared in advance.

10. The electronic device according to claim 9, further comprising member holding means that is arranged at a place other than the flat surface means and holds therein the additional functional means.

11. The electronic device according to claim 7, wherein the functional means is formed of a material, a color whereof differs from a color of the main body of the electronic device, or formed of a transparent material.

12. The electronic device according to claim 7 is an image forming apparatus.

13. An electronic device, comprising: an image forming unit; a scanning unit; and an operating unit having an operator surface thereof, the operating unit includes: a flat surface adjacent to an operating surface of the electronic device and at a lower level than the operating surface; a functional unit having a set function and arranged on the flat surface in a replaceable manner, the functional unit includes a slanting surface that recedes towards an inner side from a side of an operator who operates the operating surface; and an additional functional unit that is arranged separately from a main body of the electronic device and is replaced with the functional unit already placed in the flat surface.

14. An electronic device, comprising: an image forming unit; a scanning unit; and an operating unit having an operator surface thereof, the operating unit includes: flat surface means for arranging functional means thereof in a replaceable manner, the flat surface means being adjacent to an operating surface of the electronic device and at a lower level than the operating surface, wherein the functional means has a set function arranged on the flat surface means, and the functional means includes a slanting surface that recedes towards an inner side from a side of an operator who operates the operating surface, and an additional functional means that is arranged separately from a main body of the electronic device and is replaced with the functional unit are prepared in advance.

* * * * *